June 16, 1953      H. W. EKHOLM      2,642,161
RAILWAY BRAKE BEAM SAFETY CONNECTOR STRUCTURE
Filed Dec. 13, 1950
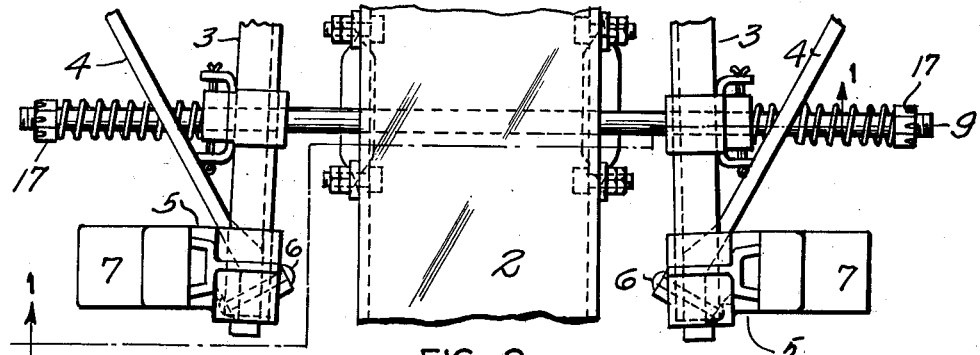
FIG. 2.
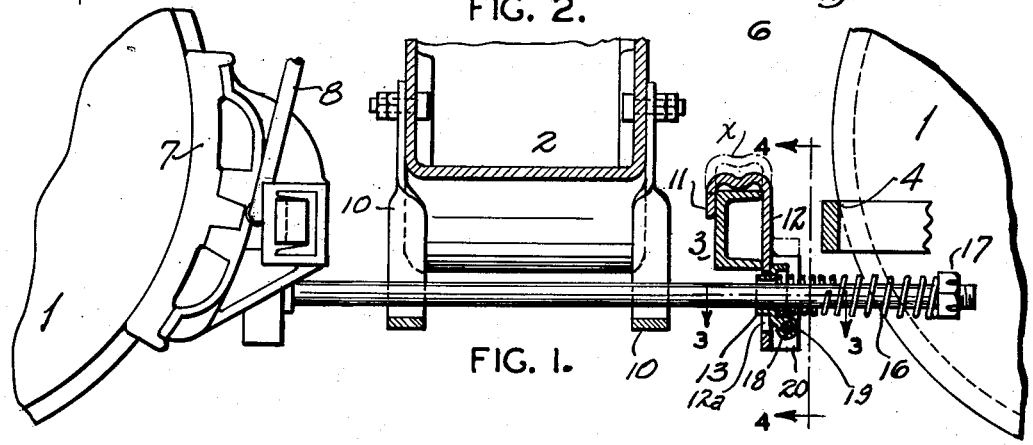
FIG. 1.
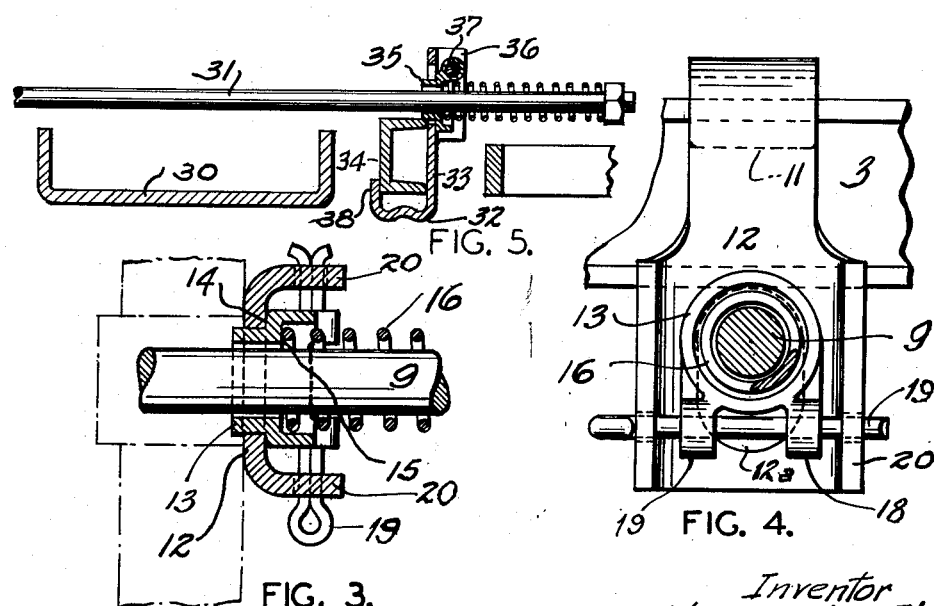
Inventor
Herbert W. Ekholm
By Rodney Bedell
Atty.

Patented June 16, 1953

2,642,161

UNITED STATES PATENT OFFICE 2,642,161

RAILWAY BRAKE BEAM SAFETY CONNECTOR STRUCTURE

Herbert W. Ekholm, Chicago, Ill., assignor to Chicago Railway Equipment Company, Chicago, Ill., a corporation of Illinois Application December 13, 1950, Serial No. 200,639

9 Claims. (Cl. 188—210)

The invention relates to safety connectors for railway brake beams and more particularly to the assembly of a pair of brake beams with a connector rod forming a safety support as disclosed generally in Hedgcock Patent 1,143,704, issued June 22, 1915.

One object of the invention is to mount a connector rod extending between adjacent beams on a single member of each beam, e. g., if the beam is a truss type beam, the connector may be mounted upon the compression member only of the beam and independently of the tension member of the beam.

Another object is to provide for the ready assembly and disassembly of the beam and the connector rod with its beam attaching bracket.

Another object is to provide a simple lightweight, economical bracket for assembling a connector rod and a beam in a combination as described above.

These and other detailed objects as will appear below are attained by the structure illustrated in the accompanying drawings, in which:

Figure 1 is, in part, a side elevation and, in part, a longitudinal, vertical section of a portion of a railway truck and is taken on the line 1—1 of Figure 2.

Figure 2 is a top view of the structure illustrated in Figure 1.

Figure 3 is a detailed horizontal section taken on the line 3—3 of Figure 1 and is drawn to an enlarged scale, the beam compression member being shown in broken lines to better illustrate the invention.

Figure 4 is a detailed vertical section taken on the line 4—4 of Figure 1 and drawn to an enlarged scale.

Figure 5 is a detailed section corresponding generally to Figure 1 but illustrating another form of the invention.

The truck, partly illustrated in Figures 1 and 2, includes wheels 1 which will be fitted on the usual axles (not shown) carrying journal boxes (not shown) mounting the truck frame (not shown), which in turn will support a bolster 2 extending transversely of the truck. At opposite sides of the bolster are brake beams, here shown in the form of trusses, each including main longitudinal members such as a channel section compression member 3, a bar tension member 4, and brake heads 5. Each head and the adjacent ends of the main members are secured together by a rivet 6. The brake heads mount the usual shoes 7 for contact with wheels 1 when the brakes are applied.

The brake heads normally will be supported from the truck frame by swing hangers 8 but in the event of the failure of a swing hanger, it is important to prevent the brake beam from dropping to the rail and for this purpose, a connector rod 9 is associated with the beams and passes through stirrup-like members 10 carried by the bolster.

Each connector rod 9 is assembled to each beam by a bracket structure including a hook-like portion 11 fitting over the top part of the channel compression member 3 and having a depending leg 12 extending below the bottom of the member and there provided with a vertically elongated slot 12a. A separately formed sleeve 13 surrounds rod 9 and is shouldered at 14 intermediate its ends. The smaller diameter portion of the sleeve fits transversely of slot 12a and is slidable vertically in slot 12a. The larger diameter portion of the sleeve forms a seat 15 for a spring 16 mounted on the end portion of rod 9 and retained by a nut 17. Ears 18 depend from sleeve 13 and are apertured to receive a retainer such as cotter pin 19 which also passes through flanges 20 on the lower portion of bracket leg 12.

When the parts are assembled, as shown, each spring 16 and pin 19 holds the associated sleeve 13 in position with the inner end of the sleeve extending immediately beneath a downwardly facing portion of compression member 3 and thereby preventing disassembly of the bracket structure from the beam.

To disassemble the pin and safety connector combination, pin 19 is withdrawn and sleeve 13 dropped to the lower end of slot 12a. The bracket and rod may then be lifted to the position indicated in broken lines at X in Figure 1 so that its hook or lip 11 may be slipped over the top of beam member 3, permitting the dropping and removal of the entire device from the brake beam.

With this arrangement, the connector rod, bracket structure, and the beam compression member are readily assembled and disassembled without reference to the beam tension member. Variations in the distance between the compression and tension members of the beam, or any play between these parts in the application and release of the brakes, will not affect the assembly of the bracket structure and the beam.

It will be understood that the rod, spring and beam assembly not only forms a safety support for the beams in the event of the failure of the hangers, but also forms a release mechanism for moving the brake shoes away from the wheels when the brakes are released, thus avoiding dragging of the shoes on the wheels.

While the connector rod is shown as passing beneath the beams, it will be understood that the relative position of these parts may be reversed, as may be particularly desirable when the truck includes a spring plank, and such an arrangement is shown in Figure 5, in which the brake beams are at opposite sides of a channel-shaped spring plank 30 and the connector rod 31 extends over the spring plank, which engages the connector rod in the event of the failure of a brake hanger and thereby provides a safety support for the beams by means of the brackets 32. Each bracket corresponds to bracket 12 previously described but is reversed, top for bottom, with its vertical leg 33 projecting upwardly from brake beam channel 34 and sleeve 35, resting on the beam channel, and secured to bracket flanges 36 by a pin 37.

The connector rod and bracket assembly may be removed from beam channel 34 by withdrawing pin 37 and dropping bracket 32 so that its hook 38 clears the bottom of the channel.

The details of the structure may be varied to meet other conditions without departing from the spirit of the invention and the exclusive use of those modifications coming within the scope of the claims is contemplated.

What is claimed is:

1. In combination with a railway brake beam including a main longitudinal member, a one piece bracket hooked around three sides of said member and extending vertically beyond the plane of the fourth side of said member and there apertured to receive a brake beam connector rod, and connector rod-receiving means passed through said aperture adjacent to the end of said aperture near the beam member to lock the beam, bracket and connector rod together, said bracket being provided with a spring seat facing in the direction opposite to the face of the bracket opposing the brake beam member.

2. Structure as described in claim 1 which includes a sleeve in the aperture for surrounding the connector rod and provided with a shoulder facing towards the apertured portion of the bracket and with a spring seat facing in the opposite direction.

3. In combination with a railway brake beam including a main longitudinal member, a one piece bracket having a hook-like body opposing three sides of said member and having a portion extending beyond the plane of the fourth side of said member and there provided with an aperture extending transversely of the beam, and a detachable sleeve, for receiving a connector rod, inserted in said aperture and forming a spring seat facing away from the brake beam member.

4. In combination, a railway brake beam member, a hook-like bracket applied to said member and including a leg extending vertically along one side of the beam member and beyond the edge of the same and there having a vertically elongated slot, a sleeve extending through said slot transversely of said leg and alongside said member, the sleeve being slidable lengthwise of said slot into a position spaced from said member, to accommodate removal of the bracket from the beam, and into a position closely adjacent said member, and a removable element holding the sleeve in the latter-mentioned position to interlock the bracket with the beam, said sleeve being arranged to receive a connector rod extending transversely of the beam.

5. In combination, spaced brake beams, an individual one piece bracket hooked over each of said beams and each bracket having a part extending along the side of the associated beam facing away from the other beam and vertically beyond the edge of the same and there provided with a transverse opening, a sleeve received in each of said openings and projecting from the bracket alongside an adjacent portion of the beam, a connector rod extending through said sleeves, and a coil spring on each end portion of the connector rod and held against movement therefrom and seated against the corresponding sleeve, each sleeve having a shoulder opposite its spring seat, engaging the associated bracket.

6. In combination in a railway truck, including a bolster and brake beams at opposite sides of the bolster, loop structure depending from the bolster, a connector rod extending transversely of the bolster through said loop structure and under the brake beams, a one piece bracket hooked over each brake beam and depending therefrom and apertured transversely of the beam, a sleeve surrounding the connector rod and slidable vertically in the bracket aperture, and detachable means holding the sleeve and connector rod spaced from the outer end of the aperture and adjacent to the bottom of the beam.

7. In combination in a railway truck, including a spring plank and brake beams at opposite sides of the spring plank, a connector rod extending transversely of and over the spring plank and the brake beams, a one piece bracket hooked under each brake beam and extending upwardly therefrom and apertured transversely of the beam, a sleeve surrounding the connector rod and slidable vertically in the bracket aperture, and detachable means holding the sleeve and connector rod spaced from the outer end of the aperture and adjacent to the top of the beam.

8. A railway brake beam connector rod bracket comprising a cross bar and parallel legs forming a hook-like member, one of the legs being substantially longer than the other and having flanges forming a U-shaped cross section, the main portion of the leg having an aperture elongated lengthwise of the leg and extending to near the outer end of the leg, a sleeve extending transversely of said leg and shouldered intermediate its ends, the smaller portion of the sleeve extending through said aperture and the shoulder bearing against said leg portion, ears on said sleeve abreast of said leg flanges, and a pin extending through said ears and flanges to hold said sleeve in a selected position in said apertures.

9. A railway brake beam connector rod bracket as described in claim 8 in which the sleeve includes a spring seat facing in the opposite direction to the sleeve shoulder.

HERBERT W. EKHOLM.

References Cited in the file of this patent

UNITED STATES PATENTS

| Number | Name | Date |
|---|---|---|
| 2,142,417 | Sale | Jan. 3, 1939 |
| 2,184,690 | Varga | Dec. 26, 1939 |
| 2,252,221 | Van Cleave et al. | Aug. 14, 1941 |